US009443295B2

(12) United States Patent
Dong et al.

(10) Patent No.: US 9,443,295 B2
(45) Date of Patent: Sep. 13, 2016

(54) METHOD AND APPARATUS FOR REDUCING ARTIFACTS IN COMPUTED TOMOGRAPHY (CT) IMAGE RECONSTRUCTION

(71) Applicant: GE MEDICAL SYSTEMS GLOBAL TECHNOLOGY CO. LLC, Waukesha, WI (US)

(72) Inventors: Shuqin Dong, Beijing (CN); Jiaqin Dong, Beijing (CN); Shuo Li, Beijing (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/471,316

(22) Filed: Aug. 28, 2014

(65) Prior Publication Data

US 2015/0092907 A1    Apr. 2, 2015

(30) Foreign Application Priority Data

Sep. 30, 2013  (CN) .......................... 2013 1 0461156

(51) Int. Cl.
*G06K 9/00* (2006.01)
*A61B 6/00* (2006.01)
*G06T 5/50* (2006.01)
*G06T 11/00* (2006.01)

(52) U.S. Cl.
CPC ............... *G06T 5/50* (2013.01); *G06T 11/008* (2013.01)

(58) Field of Classification Search
None
See application file for complete search history.

(56) References Cited

U.S. PATENT DOCUMENTS

| 8,886,283 | B1 * | 11/2014 | Chen | ............................ 382/128 |
| 9,177,374 | B2 * | 11/2015 | Stayman | ............... G06T 7/0012 |
| 2011/0075911 | A1 * | 3/2011 | Xing | .................... G06T 7/0083 382/131 |
| 2012/0308101 | A1 * | 12/2012 | Zeng | ..................... G06T 11/008 382/131 |
| 2013/0188848 | A1 * | 7/2013 | Helm | ..................... G06T 11/00 382/131 |
| 2013/0303884 | A1 * | 11/2013 | Kuntz | ................... G06T 11/006 600/417 |
| 2014/0010431 | A1 * | 1/2014 | Stayman | ............... G06T 7/0012 382/131 |
| 2014/0169524 | A1 * | 6/2014 | Sperl | .................... G01N 23/046 378/62 |

OTHER PUBLICATIONS

"Adaptive Normalized Metal Artifact Reduction (ANMAR) in Computed Tomography," Esther Meyer, et al., 2011 IEEE Nuclear Science Symposium Conference Record, 2011, pp. 2560-2565.*

(Continued)

*Primary Examiner* — Wenpeng Chen
(74) *Attorney, Agent, or Firm* — GE Global Patent Operation

(57) ABSTRACT

The present invention provides a method and apparatus for reducing artifacts in Computed Tomography (CT) image reconstruction. The method comprises acquiring an original reconstructed image, then conducting total variation processing for the original reconstructed image generating a total variation reconstructed image, conducting an initial metal artifact reduction processing for the original reconstructed image generating an initial metal artifact reduction reconstructed image, generating a weighted image based on the total variation reconstructed image and the initial metal artifact reduction reconstructed image, wherein the weighted image reflects that the original reconstructed image contains white-band artifactsd combining a portion of the original reconstructed image and a portion of the initial metal artifact reduction reconstructed image through the weighted image to generate a final image, wherein the final image does not contain white-band artifact.

11 Claims, 6 Drawing Sheets

(56) References Cited

OTHER PUBLICATIONS

"Metal artifact reduction in CT using fusion based prior image," Jun Wang, et al., Med. Phys. 40 (8), Aug. 2013, pp. 081903-1 to 081903-8.*

Sequentially reweighted TV minimization for CT metal artifact reduction, Xiaomeng Zhang, et al.Med. Phys. 40 (7), Jul. 2013, pp. 071907-1 to 071907-12.*

"A hybrid metal artifact reduction algorithm for x-ray CT," Yanbo Zhang et al., Med. Phys. 40 (4), Apr. 2013, pp. 041910-1 to 041910-17.*

"Weighted Total Variation Constrained Reconstruction for Reduction of Metal Artifact in CT," Yanbo Zhang et al., Nuclear Science Symposium Conference Record (NSS/MIC), 2010 IEEE Year: 2010, pp. 2630-2634.*

\* cited by examiner

METHOD AND APPARATUS FOR REDUCING ARTIFACTS IN COMPUTED TOMOGRAPHY (CT) IMAGE RECONSTRUCTION

TECHNICAL FIELD

The present invention generally relates to Computed Tomography (CT), in particular, relates to a method and apparatus for reducing artifacts in CT image reconstruction.

BACKGROUND OF THE INVENTION

Auxiliary diagnosis devices include Magnetic Resonance (MR) systems, ultrasonic systems, X-ray computed tomography systems, X-ray positron emission tomography (PET) systems, nuclear medical and other types of imaging systems.

For example, when a CT system is adopted to conduct X-ray CT imaging of a patient, X-rays are used for imaging of features of internal structures and regions of interest (ROI) of the patient's body. The imaging is completed by a CT scanner. During operation, scanning is conducted to the object to be photographed and raw data is collected, and then an image is reconstructed according to the raw data.

Objects having a high X-ray absorption property, such as metal substances, will cause artifacts in the reconstructed CT images, and affect diagnosis results. For example, metal dentures, artificial joint, biopsy needles, surgical clips, etc. will generate thin line-shaped or radiant lights during the reconstruction process of images.

These artifacts can be reduced through the existing Metal Artifact Reduction (MAR) techniques. However, some existing metal artifact reduction techniques may suffer from the problems of possibly decreasing resolution of images while reducing artifacts. Or, the problem of resolution is taken into consideration, but there possibly exist the problem of metal artifacts, such as white-band artifacts.

BRIEF SUMMARY OF THE INVENTION

One embodiment of the present invention provides a method for reducing artifacts in CT image reconstruction. The method includes the following steps: firstly acquiring an original reconstructed image; then conducting total variation processing for the original reconstructed image, to generate a total variation reconstructed image; then conducting initial metal artifact reduction processing for the original reconstructed image, to generate an initial metal artifact reduction reconstructed image; then generating a weighted image based on the total variation reconstructed image and the initial metal artifact reduction reconstructed image, wherein the weighted image reflects that the original reconstructed image contains white-band artifacts; then combining a portion of the original reconstructed image and a portion of the initial metal artifact reduction reconstructed image through the weighted image to generate a final image, wherein the final image does not contain white-band artifact.

Another embodiment of the present invention provides an apparatus for reducing artifacts in CT image reconstruction. The apparatus includes: an acquiring means, a total variation processing means, an initial metal artifact reduction processing means, a weighted image generating means and a final image generating means. The acquiring means is mainly used for acquiring an original reconstructed image; the total variation processing means is mainly used for conducting total variation processing for the acquired original reconstructed image, to generate a total variation reconstructed image; the initial metal artifact reduction processing means is mainly used for conducting initial metal artifact reduction processing for the original reconstructed image, to generate an initial metal artifact reduction reconstructed image; the weighted image generating means is mainly used for generating a weighted image based on the total variation reconstructed image and the initial metal artifact reduction reconstructed image, wherein the weighted image reflects that the original reconstructed image contains white-band artifacts; the final image generating means is mainly used for combining a portion of the original reconstructed image and a portion of the initial metal artifact reduction reconstructed image through the weighted image to generate a final image, wherein the final image does not contain white-band artifact.

A further embodiment according to the present invention provides a computer program product, includes instructions stored on a non-volatile recording medium, which instructions, when being executed in a processor, implement steps of the method as revealed in the embodiment of the present invention.

The fourth aspect of the embodiment provides a non-volatile storage medium, storing instructions which implement steps of the method as revealed in the embodiment of the present invention when being executed in a processor.

BRIEF DESCRIPTION OF THE DRAWINGS

In order to more thoroughly understand the disclosure of the present invention, see the detailed description below as provided in combination with the following drawings, wherein in the drawings.

DETAILED DESCRIPTION OF THE INVENTION

In the following detailed description with reference to the accompanying drawings as a part thereof, some specific embodiments in which the present disclosure is achieved are illustrated. The embodiments are set forth with sufficient details to enable persons skilled in the art to carry out the present disclosure. It shall be understood that the embodiments can be combined or other embodiments can be used and that structural, logical and electrical modifications can be made, without departing from the scope of the various embodiments of the present disclosure. Hence, the following detailed description shall be deemed as illustrative rather than limitative. The range of the present invention is defined the appended claims and the equivalents thereof.

Figure 1:
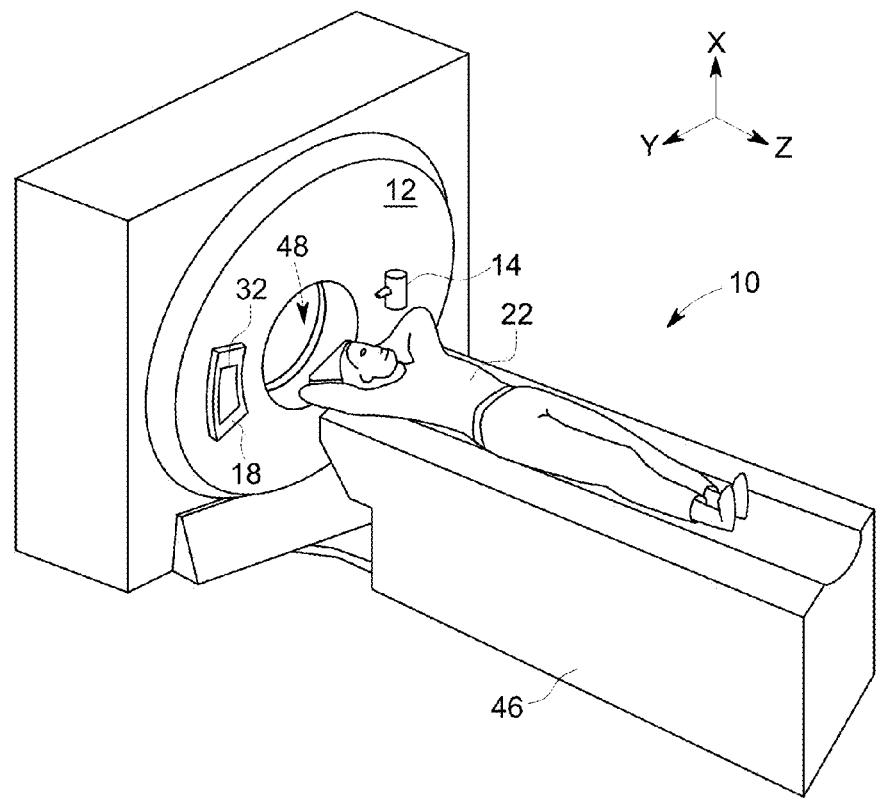
FIG. 1 is a structural diagram of the CT imaging system according to the present disclosure.
Figure 2:
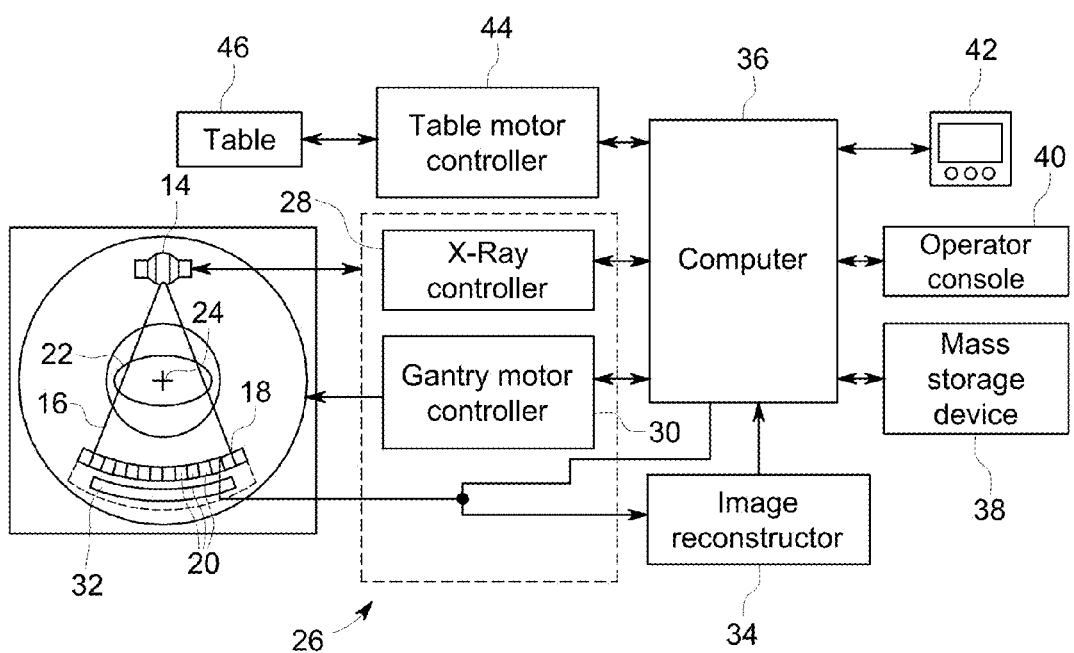
FIG. 2 is a schematic block diagram of the system as shown in FIG. 1.

Referring to FIGS. 1 and 2, an X-ray Computed Tomography (CT) imaging system 10 is shown to includes a gantry 12. In a non-limitative example, the system 10 has a "third-generation" CT scanner. The gantry 12 has an X-ray source 14 that projects an X-ray beam 16 towards a detector assembly 18 on the opposite side of the gantry 12. The detector assembly 18 is composed of a plurality of detectors 20 and a data acquisition system (DAS) 32. The plurality of detectors 20 sense projected X-rays that pass through a medical patient 22, wherein each detector 22 produces an analog electrical signal that represents the intensity of the X-ray beam impinging on and hence being attenuated by the patient as it passes through the patient 22. A detector 20 usually includes a collimator for collimating the X-ray beam received at the detector, a scintillator adjacent to the collimator for converting X-rays into luminous energy, and a photodiode for receiving the luminous energy from the adjacent scintillator and the electrical signals generated therefrom. Generally, each scintillator in an array of scintillators will convert X-rays into luminous energy. Each scintillator will release the luminous energy to a photodiode adjacent thereto. Each photodiode detects the luminous energy and generates a corresponding electrical signal. Each detector 20 of an detector array 18 produces individual electrical signal, and the electrical signal represents the intensity of an impinging radiation beam (for example, an X-ray beam) and hence can be used to estimate the attenuation of the radiation beam as it passes through an object or the patient 22.

During a scan to acquire X-ray projection data, the gantry 12 and the components mounted thereon rotate about a center of rotation 24. The rotation of the gantry 12 and the operation of the X-ray source 14 both can be governed by a control mechanism 26 of the CT system 10. The control mechanism 26 includes an X-ray controller 28 that provides power and timing signals to the X-ray source 14, and a gantry motor controller 30 that controls rotational speed and position of the gantry 12. The DAS 32 in the control mechanism 26 samples analog data from the detector 20 and converts the analog data into digital signals for subsequent processing. The output of DAS 32 includes projection data set in attenuation measurement obtained at a particular gantry rotation angle (e.g. angle of view). When the gantry 12 rotates, a plurality of views can be obtained in a single rotation. A single rotation refers to a complete 360 degree revolution of the gantry 12. Each view has a corresponding angle of view and a particular position on the gantry 12.

The reconstructed image is used as an input to a computer 36, which stores the image in a mass storage device 38.

The computer 36 also receives commands and scan parameters from an operator via an operator console 40. The operator console 40 has a certain form of operator interface, such as a keyboard, a mouse, a voice-activated controller, or any other suitable input devices. An associated display 42 allows the operator to view other data and reconstructed images from the computer 36. The commands and parameters from the operator can be used by the computer 36 to provide control signals and information to the DAS 32, the X-ray controller 28, and the gantry motor controller 30. In addition, the computer 36 operates a table motor controller 44, which controls a motorized table 46 to position the patient 22 and the gantry 12. In particular, the table 46 moves the patient 22 entirely or partially through a gantry opening 48 as shown in FIG. 1.

In one embodiment, the computer 36 includes a device 50, for example, a floppy disk drive, CD-ROM drive, DVD drive, magnetic optical disk (MOD) device, or any other digital device including a network connecting device such as an Ethernet device, for reading instructions and/or data from a computer-readable medium 52, such as a floppy disk, a CD-ROM, a DVD or another digital source such as a network or the Internet, as well as yet to be developed digital devices. In another embodiment, the computer 36 executes instructions stored in firmware (not shown). In some configurations, the computer 36 and/or image reconstructor 34 is/are programmed to execute the functions stated herein.

Figure 4:
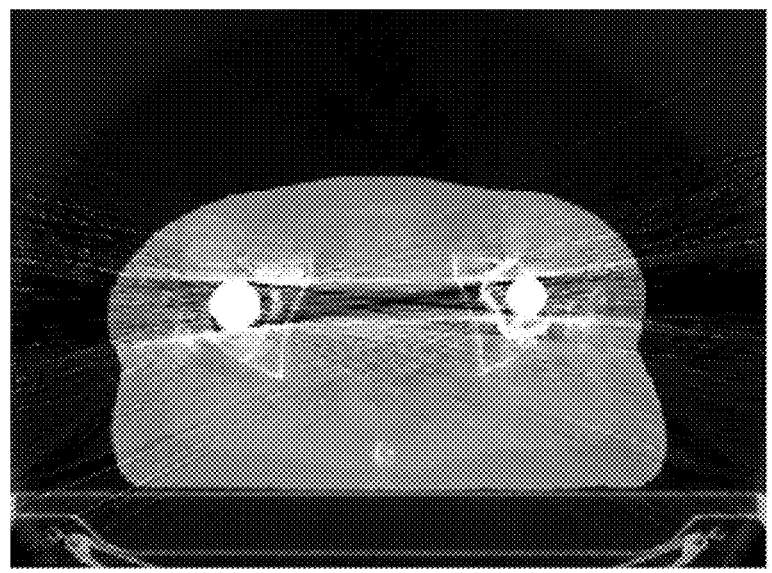
FIG. 4 is an image that is originally reconstructed without adopting metal artifact reduction techniques.

The following embodiment takes the projections on buttocks as an example to illustrate the present disclosure. In this example, leg bones at both sides contain metal. FIG. 4 is an image $I^{orig}$ that is originally reconstructed without adopting metal artifact reduction techniques, from which image it can be seen that there exist countless thin lines, and two thick white lines, i.e., white-band artifacts.

Figure 3:
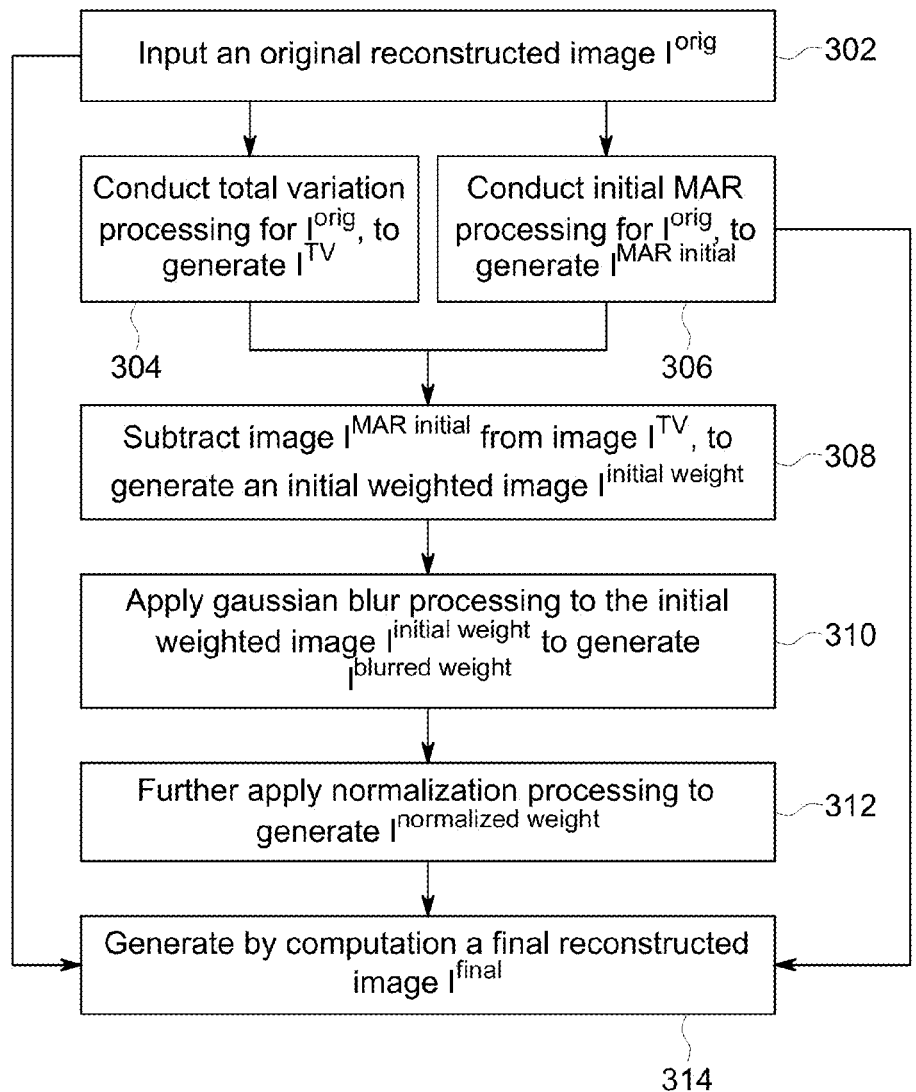
FIG. 3 is a processing flow chart of the metal artifact reduction technique according to the embodiment of the present disclosure.
Figure 6:
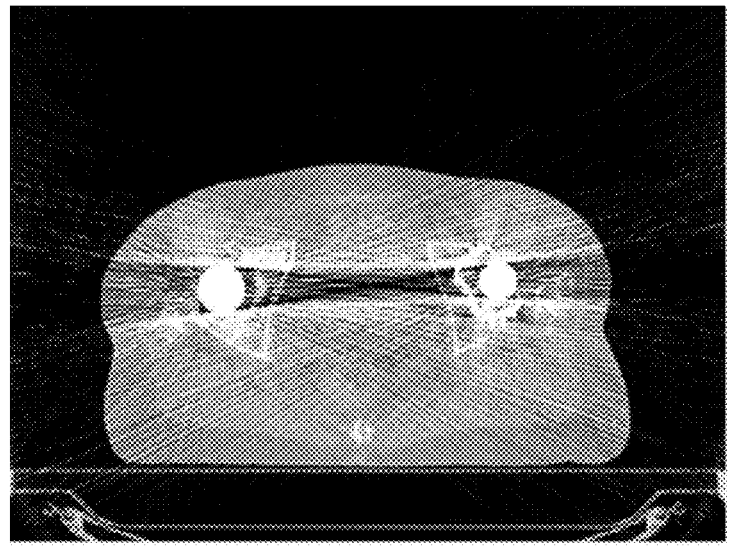
FIG. 6 is an image that is generated by adopting total variation processing to the original reconstructed image according to the embodiment of the present disclosure.

FIG. 3 is a processing flow chart of the metal artifact reduction technique according to the present disclosure; At first, at Step 302, an original reconstructed image $I^{orig}$ is acquired. The original reconstructed image $I^{orig}$ can be input after reconstructing projection data of the DAS 32 in the image reconstructor 34, can also be acquired from the mass storage device 38, optionally, can also be acquired from the computer 36. Subsequently, at Step 304, a total variation method is used to process the original reconstructed image $I^{orig}$. One objective of using the total variation method for processing is to eliminate the thin lines and noises in the original reconstructed image, and to retain some details while denoising. The total variation processed image $I^{TV}$ is shown by FIG. 6, and it can obviously seen that, after total variation process, thin line artifacts reduce, while thick white-band artifacts are retained, so as to generate a weighted image. A total variation processing is achieved through the gradient decent technique. Total variation is defined as a sum of all pixels of image gradient of each point, expressed as:

$$\|f\|_{TV} = \sum_{x,y} |\vec{\nabla} f_{x,y}| = \sum_{x,y} \sqrt{(f_{x,y} - f_{x-1,y})^2 + (f_{x,y} - f_{x,y-1})^2}.$$

Firstly, partial derivatives are calculated on $\|\vec{f}\|TV$, and the variation normalization of image is calculated as follows:

$$\frac{\partial \|\vec{f}\|_{TV}}{\partial f_{x,y}} \approx \frac{(f_{x,y} - f_{x-1,y}) + (f_{x,y} - f_{x,y-1})}{\sqrt{\epsilon + (f_{x,y} - f_{x-1,y})^2 + (f_{x,y} - f_{x,y-1})^2}} - \frac{(f_{x+1,y} - f_{x,y})}{\sqrt{\epsilon + (f_{x+1,y} - f_{x,y})^2 + (f_{x+1,y} - f_{x+1,y-1})^2}} - \frac{(f_{x,y+1} - f_{x,y})}{\sqrt{\epsilon + (f_{x,y+1} - f_{x,y})^2 + (f_{x,y+1} - f_{x-1,y+1})^2}}$$

wherein $\epsilon$ is a relatively small positive number, and the addition thereof is to avoid the singularity in gradient calculation.

Next, the following formula is adopted to conduct a certain number of iterations, thereby obtaining image data after the total variation processing:

$$f_{x,y}^{(k+1)} = f_{x,y}^{(k)} - \alpha \frac{\partial \|\vec{f}\|_{TV}}{\partial f_{x,y}}$$

The selection of value α and determination of number of iterations, the manner of experimentation can be adopted. If the value α is too large, convergence is too fast, while if the value α is too small, there are too many iterations again. In order to balance the number of iterations and the convergence rate, we will initially set the value α very high, and then use the release factor β<1 to gradually decrease it; after k iterations, the value α is calculated as follows: $\alpha_k = \alpha_1 \beta^{(k-1)}$.

When initial α=0.0175, and β=0.9, after 35 iterations, a basically stable value α is derived. It is equivalent to result of the total variation in which the value α is taken as 0.002 and the number of iterations is 100.

Figure 5:
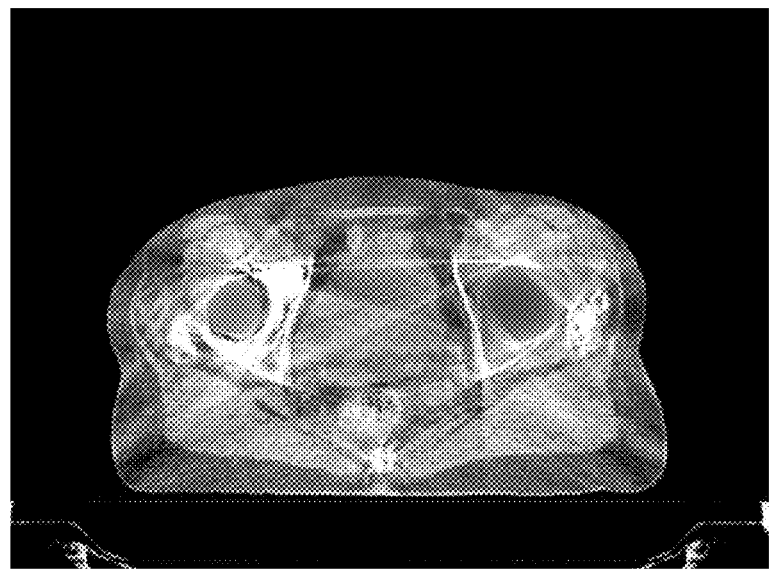
FIG. 5 is an image that is reconstructed by adopting the existing metal artifact reduction techniques.

Simultaneously or successively, at Step 306, the existing metal artifact reduction techniques are applied to the original reconstructed image $I^{orig}$, e.g., through the following steps: determining a metal projection area in the original reconstructed image $I^{orig}$; conducting interpolation correction processing for projection values in the metal projection area; then conducting restoration and reconstruction processing for the original reconstructed image $I^{orig}$, so as to preliminarily reduce metal artifacts; an initial metal artifact reduction reconstructed image $I^{MAR\ initial}$ generated by applying the existing metal artifact reduction techniques to the original reconstructed image $I^{orig}$, is shown in FIG. 5, wherein thin lines are obviously eliminated, but it can be seen that resolution around leg bones declines, and becomes blurred.

It should be noted that, the existing metal artifact reduction techniques are not limited to the example as enumerated above, and can be various metal artifact reduction techniques that are well known or commonly used in the art.

Figure 7:
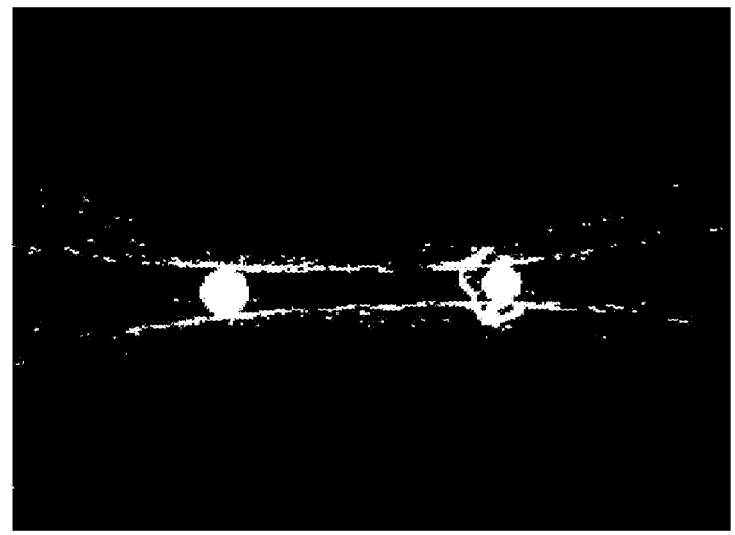
FIG. 7 is a weighted image that is generated according to the embodiment of the present disclosure.

Next, at Step 308, by subtracting the matrix of the image $I^{MAR\ initial}$ from the matrix of the image $I^{TV}$, an initial weighted image $I^{initial\ weight}$, as shown in FIG. 7, is generated, using the formula as follows:

$$I^{initial\ weight} = I^{TV} - I^{MAR\ initial}.$$

Next, at Step 310, Gaussian smoothing processing is applied to the initial weighted image $I^{initial\ weight}$ to generate $I^{blurred\ weight}$ Gaussian smoothing filter is a linear smoothing filter, for the elimination of Gaussian noise, widely used in noise reduction of image processing. Briefly, Gaussian filter is a process of conducting a weighted average to the whole image, and the value of each pixel point is obtained by conducting a weighted average of itself and other pixel values in the neighborhood thereof. Specific operations of Gaussian filter are as follows: to scan each pixel in an image using a template (or called convolution, mask), and to substitute a weighted average gray value of pixels in the neighborhood that is determined by the template for the value of the center pixel point of the template.

Then, at Step 312, after the Gaussian blur processing is applied, normalization processing is further applied to generate $I^{normalized\ weight}$. The objective of normalization is to produce a weight in a numeral range of 0~1. The formula of the normalization processing is as follows:

$$I^{normalized\ weight} = I^{blurred\ weight} / \max(\text{CT values of } I^{blurred\ weight}).$$

Then, at Step 314, according to the above various results, a final reconstructed image $I^{final}$ is generated by calculation using the following formula:

$$I^{final} = I^{normalized\ weight} * I^{MAR\ initial} + (1 - I^{normalized\ weight}) * I^{orig}.$$

Figure 8:
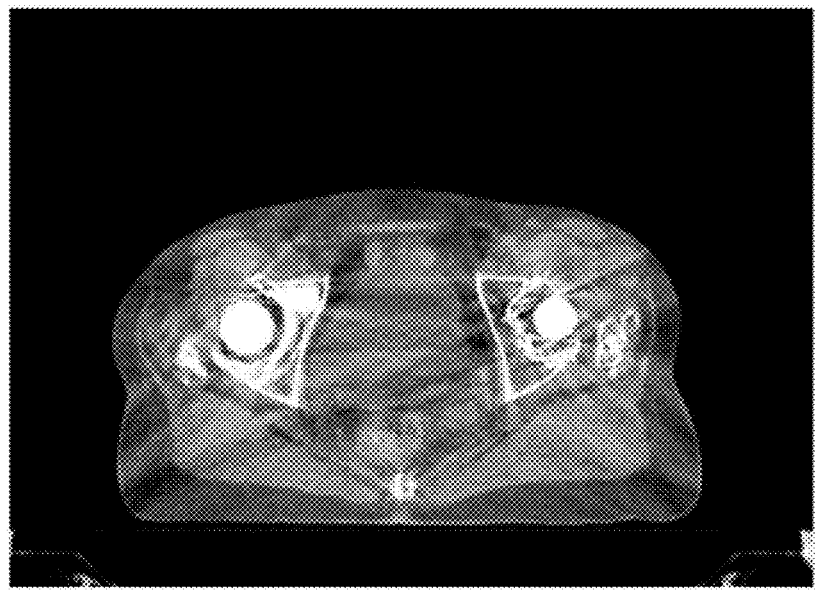
FIG. 8 is a final image that is reconstructed by adopting the metal artifact technique according to the embodiment of the present disclosure.

The generated final reconstructed image $I^{final}$ is shown in FIG. 8. Obviously, thick white line artifacts are eliminated, insufficient quantity of information at the position is repaired, and compared with the existing metal artifact reduction techniques, the defect of insufficient resolution of leg bonds is remedied.

Figure 9:
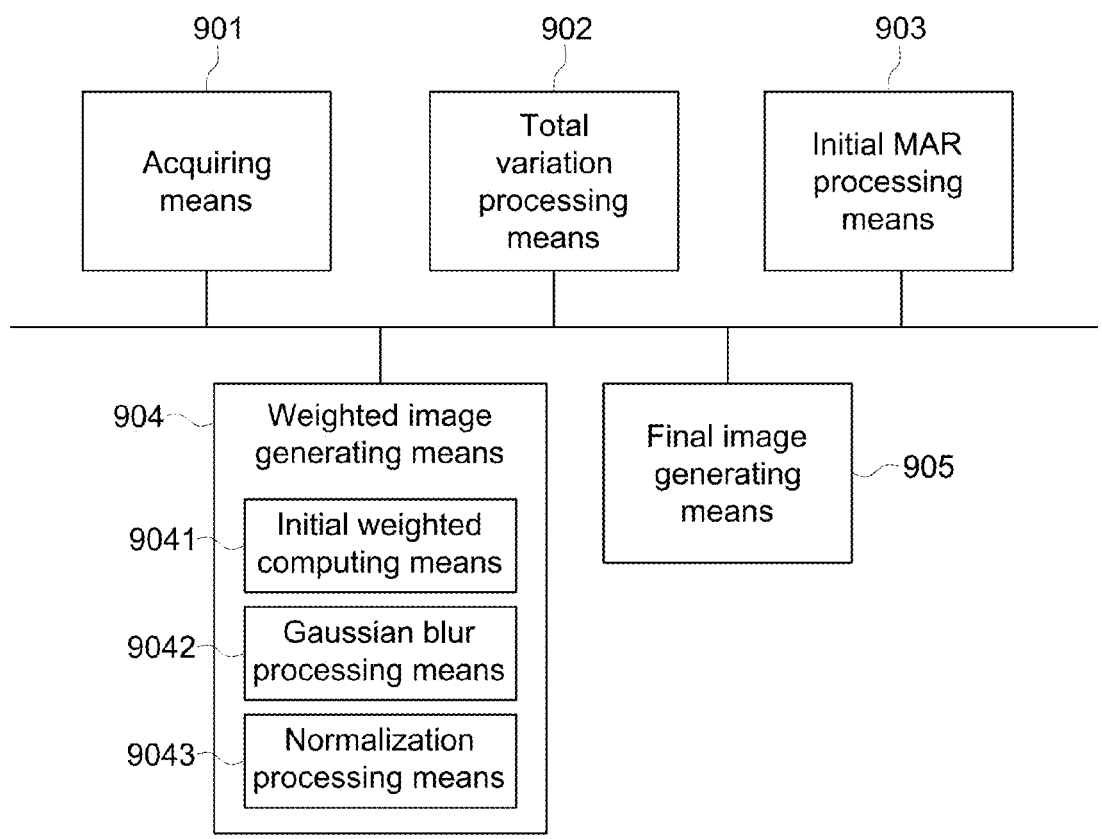
FIG. 9 is a block diagram of an apparatus for metal artifact reduction in image reconstruction according to the embodiment of the present disclosure.

FIG. 9 is a block diagram of an apparatus for metal artifact reduction in image reconstruction according to the embodiment of the present disclosure. Wherein the apparatus 900 for reducing artifacts in CT image reconstruction includes: an acquiring means 901, a total variation processing means 902, an initial metal artifact reduction processing means 903, a weighted image generating means 904 and a final image generating means 905. Wherein the acquiring means 901 is at least coupled to the total variation processing 902, the initial metal artifact reduction processing means 903 and the final image generating means 905, and the weighted image generating means 904 is at least coupled to the total variation processing 902, the initial metal artifact reduction processing means 903 and the final image generating means 905. In FIG. 9, for the sake of illustration, various means are coupled with each other. However, it should be noted that, various means can be coupled with each other in any other connection manners, as long as the following various functions can be realized. Moreover, the functions of multiple means can be integrated into one means for realization, while each means can also be further divided into more means for realization, and, the number of the same means in the system can be greater than 1.

The acquiring means 901 is mainly used for acquiring an original reconstructed image; the total variation processing means 902 is mainly used for conducting total variation processing for the acquired original reconstructed image, to generate a total variation reconstructed image; the initial metal artifact reduction processing means 903 is mainly used for conducting initial metal artifact reduction processing for the original reconstructed image, to generate an initial metal artifact reduction reconstructed image; the weighted image generating means 904 is mainly used for generating a weighted image based on the total variation reconstructed image and the initial metal artifact reduction reconstructed image, wherein the weighted image reflects that the original reconstructed image contains white-band artifacts; the final image generating means 905 is mainly used for combining a portion of the original reconstructed image and a portion of the initial metal artifact reduction reconstructed image through the weighted image to generate a final image, wherein the final image does not contain white-band artifact.

At first, the acquiring means 901 acquires an original reconstructed image $I^{orig}$. The original reconstructed image $I^{orig}$ can be input after reconstructing projection data of the DAS 32 in the image reconstructor 34, can also be acquired from the mass storage device 38, optionally, can also be acquired from the computer 36. Then, the total variation processing means 902 uses a total variation method to process the original reconstructed image $I^{orig}$. One objective of using the total variation method for processing is to eliminate the thin lines and noises in the original reconstructed image, and to retain some details while denoising. The total variation processed image $I^{TV}$ is shown by FIG. 6, and it can obviously seen that, after total variation process, thin line artifacts reduce, while thick white-band artifacts are retained, so as to generate a weighted image. One example of total variation processing has been described above.

Simultaneously or successively, the initial metal artifact reduction (MAR) processing means 903 applies the existing metal artifact reduction techniques to the original reconstructed image $I^{orig}$, e.g., through the following steps: determining a metal projection area in the original reconstructed image $I^{orig}$; conducting interpolation correction processing for projection values in the metal projection area; then conducting restoration and reconstruction processing for the original reconstructed image $I^{orig}$, so as to preliminarily reduce metal artifacts; an initial metal artifact reduction reconstructed image $I^{MAR\ initial}$, generated by applying the existing metal artifact reduction techniques to the original reconstructed image $I^{orig}$, is shown in FIG. 5, wherein thin lines are obviously eliminated, but it can be seen that resolution around leg bones declines, and becomes blurred.

It should be noted that, the existing metal artifact reduction techniques are not limited to the example as enumerated above, and can be various metal artifact reduction techniques that are well known or commonly used in the art.

The weighted image generating means 904 is used to generate a weighted image. According to one embodiment, the means further includes an initial weighted image generating means 9041, a Gaussian processing means 9042 and a normalization processing means 9043. The initial weighted image generating means 9041 generates an initial weighted image $I^{initial\ weight}$, as shown in FIG. 7, by subtracting the matrix of the image $I^{MAR\ initial}$ from the matrix of the image using the formula as follows:

$$I^{initial\ weight} = I^{TV} - I^{MAR\ initial}.$$

The Gaussian blur processing means 9042 applies Gaussian smoothing processing to the initial weight image $I^{initial\ weight}$ to generate $I^{blurred\ weight}$. Gaussian smoothing filter is a linear smoothing filter, for the elimination of Gaussian noise, widely used in noise reduction of image processing. Briefly, Gaussian filter is a process of conducting a weighted average to the whole image, and the value of each pixel point is obtained by conducting a weighted average of itself and other pixel values in the neighborhood thereof. Specific operations of Gaussian filter are as follows: to scan each pixel in an image using a template (or called convolution, mask), and to substitute a weighted average gray value of pixels in the neighborhood that is determined by the template for the value of the center pixel point of the template.

The normalization processing means 9043 further applies normalization processing to the weighted image to which the Gaussian blur processing has been applied, so as to generate $I^{normalized\ weight}$. The objective of normalization is to produce a weight in a numeral range of 0~1. The formula of the normalization processing is as follows:

$$I^{normalized\ weight} = I^{blurred\ weight} / \max(\text{CT values of } I^{blurred\ weight}).$$

According to the above various results, the final image generating means 905 calculates a final reconstructed image $I^{final}$ using the following formula:

$$I^{final} = I^{normalized\ weight} * I^{MAR\ initial} + (1 - I^{normalized\ weight}) * I^{orig}.$$

The generated final reconstructed image $I^{final}$ is shown in FIG. 8. Obviously, thick white line artifacts are eliminated, insufficient quantity of information at the position is repaired, and compared with the existing metal artifact reduction techniques, the defect of insufficient resolution of leg bonds is remedied.

As used herein, the term "a" or "an" is intended to mean both singular and plural more than one. The term "or" means a nonexclusive or, unless otherwise indicated.

Also as used herein, the phrase "reconstructing an image" is not intended to exclude embodiments of the present disclosure in which data representing an image is generated instead of a viewable image. Therefore, the term "image" refers generally to viewable images and data representing a viewable image. However, many embodiments generate (or are configured to generate) at least one viewable image.

The operation environment of the present disclosure has been described with respect to a 16-slice X-ray Computed Tomography (CT) system. However, one skilled in the art will appreciate that the present disclosure is also applicable to multi-slice configuration systems, and to the systems capable of moving or "littering" focus during operation. Moreover, the present disclosure is described with regard to the detection and conversion of X-rays. However, one skilled in the art would further appreciate that the present disclosure is also applicable to detection and conversion of other high frequency electromagnetic energies. Although the specific embodiments mentioned above are described with reference to a third generation CT system, the methods described herein also apply to fourth generation CT systems (e.g., stationary detector with rotating x-ray source) and fifth generation CT systems (e.g., stationary detector and x-ray source). Additionally, it is contemplated that the benefits of the present disclosure expand to imaging modalities other than CT, such as MRI, SPECT and PET.

Various embodiments or the components thereof may be achieved as a part of a computer system. The computer system may include a computer, an input device, a display unit and an interface, for example for accessing the Internet. The microprocessor can be connected to the communication bus. The computer may also include a memory. The memory may include a random access memory (RAM) and a read only memory (ROM). The computer system may further include a storage device, which may be a hard disk drive or a removable storage device such as a floppy disk drive and an optical drive. The storage device can also be used in other similar devices for loading computer programs or other instructions into the computer system.

In various embodiments of the present disclosure, the method for creating the method for reducing artifacts in CT reconstruction as described herein may be embodied in the form of a processor. Typical examples of processors include general purpose computers, programmed microprocessors, digital signal processors (DSPs), microcontrollers, peripheral integrated circuit elements, and other equipments or layout of equipments able to realize the method steps described herein.

As used herein, the term "computer" is not limited to those integrated circuits referred to in the art as computers, but may include any processor-based or microprocessor-based systems, including systems using microcontrollers, reduced instruction set circuits (RISC), application specific integrated circuits (ASIC), logic circuits, and any other circuits or processor capable of performing the functions described herein. The above examples are exemplary only, and are not intended in any way to limit the definition and/or meaning of the term "computer". The terms such as computers, processors, microcontrollers, microcomputers, programmable logic controllers, application specific integrated circuits, and other programmable circuits are used interchangeably herein.

Processing entity executes a set of instructions (e.g., corresponding to the method steps), which are stored in one or a plurality of storage elements (also known as computer-usable medium). The memory element can take the form of a database or physical storage elements in the processor. The memory element can also hold data or other information as needed. Physical memory may be, for example, but not limited to, electronic, magnetic, optical, electromagnetic, infrared, or semiconductor systems, apparatuses, equipments, or propagation media. More specific examples of physical memory may include, but not limited to, random access memories (RAM), read only memories (ROM), erasable programmable read-only memories (EPROM or Flash memory), hard disk drives (HDD) and Compact-Disk Read-Only-Memory (CDROM). These memory types are exemplary only, and thus the types of the memory that can be used for storing a computer program are not limitative.

The instruction set may include various commands, which instruct the processor to perform specific operations, such as the processes in various embodiments of the present disclosure. The instruction set may be in the form of a software program. Software may be in the various forms, such as system software or application software. In addition, the software may be an independent program, a program module in a larger program, or a set of some program modules. The software also may include a modular programming in the form of an object-oriented programming. A processor may process input data in response to a user's command, or a result of a previous processing, or a request made by another processor.

In various embodiments of the present disclosure, the method for reducing artifacts in CT reconstruction can be realized by software, hardware, or a combination thereof. For example, the method provided in various embodiments of the present disclosure can be realized in software by using standard programming language (such as C, C++, Java, etc). As used herein, the terms "software" and "firmware" can be used interchangeably, and may include any computer programmability stored in a memory for execution by a computer.

In addition, although the method stated herein is described with respect to an X-ray Computed Tomography (CT) system used in a medical situation, it can be expected that these benefits may facilitate magnetic resonance (MR) systems, ultrasonic systems, X-ray positron emission tomography (PET) systems, nuclear medical and other types of imaging systems. It can be applied to specific organs or structures, including biological organs such as brain, stomach, heart, lung or liver; biological structures, such as diaphragm, chest wall, chest, ribs, spine, breastbone or pelvis; tumor, injury or sore, for example, compression fracture.

What is claimed is:

1. A method for reducing artifacts in Computed Tomography (CT) image reconstruction, the method comprising:
   acquiring an original reconstructed image;
   conducting total variation processing for the original reconstructed image, to generate a total variation reconstructed image;
   conducting initial metal artifact reduction processing for the original reconstructed image, to generate an initial metal artifact reduction reconstructed image;
   generating a weighted image based on the total variation reconstructed image and the initial metal artifact reduction reconstructed image, wherein the weighted image reflects that the original reconstructed image contains white-band artifacts; and
   combining a portion of the original reconstructed image and a portion of the initial metal artifact reduction reconstructed image through the weighted image to generate a final image, wherein the final image does not contain white-band artifact.

2. The method for reducing artifacts in Computed Tomography image reconstruction according to claim 1, wherein the generating of a weighted image based on the total variation reconstructed image and the initial metal artifact reduction reconstructed image further comprises:
   subtracting the initial metal artifact reduction reconstructed image from a matrix of the total variation reconstruction image to generate an initial weighted image matrix;
   applying Gaussian blur processing to the initial weighted image matrix, to generate a Gaussian weighted image matrix;
   applying normalization processing to the Gaussian weighted image matrix, to generate the weighted image.

3. The method for reducing artifacts in Computed Tomography image reconstruction according to claim 2, wherein the normalization processing is to divide a Gaussian weighted image matrix by a maximum of CT values of the Gaussian weighted image.

4. The method for reducing artifacts in Computed Tomography image reconstruction according to claim 1, further comprising:
   generating a final image by multipling the weighted image by a matrix of the initial metal artifact reduction reconstructed image, and
   adding a product of a result of 1 minus the weighted image matrix and a matrix of the original reconstructed image.

5. The method for reducing artifacts in Computed Tomography image reconstruction according to claim 1, wherein the initial metal artifact reduction processing comprises:
   determining a metal projection area in the original reconstructed image;
   conducting interpolation correction processing for projection values in the metal projection area; and
   conducting restoration and reconstruction processing for the original reconstructed image.

6. An apparatus for reducing artifacts in Computed Tomography image reconstruction, the apparatus comprising:
   an acquisition device, configured to acquire an original reconstructed image;
   a total variation processor, configured to:
      conduct a total variation processing for the acquired original reconstructed image, and
      generate a total variation reconstructed image based on the total variation processing
   an initial metal artifact reduction processor configured to:
      conduct an initial metal artifact reduction processing for the original reconstructed image; and
      generate an initial metal artifact reduction reconstructed image based on the initial meal artifact reduction processing;
   a weighted image generator configured to:
      generate a weighted image based on the total variation reconstructed image and the initial metal artifact reduction reconstructed image, wherein the weighted image reflects that the original reconstructed image contains white-band artifacts; and a final image generator configured to:
combine a portion of the original reconstructed image and a portion of the initial metal artifact reduction reconstructed image through the weighted image to generate a final image, wherein the final image docs not contain white-band artifact.

7. The apparatus for reducing artifacts in Computed Tomography image reconstruction according to claim 6, wherein the weighted image generator further comprises:
an initial weighted computing device configured to:
substract the initial metal artifact reduction reconstructed image from a matrix of the total variation reconstruction image to generate an initial weighted image matrix;
a Gaussian blur processor, configured to apply a Gaussian blur processing to the initial weighted image matrix, to generate a Gaussian weighted image matrix; and
a normalization processor, configured to:
conduct a normalization processing to the Gaussian weighted image matrix, to generate the weighted image.

8. The apparatus for reducing artifacts in Computed Tomography image reconstruction according to claim 7, wherein the normalization processing comprises:
dividing the Gaussian weighted image matrix by the maximum of CT values of the Gaussian weighted image.

9. The apparatus for reducing artifacts in Computed Tomography image reconstruction according to claim 6, wherein the final image generator is further configured to:
multiply the weighted image by a matrix of the initial metal artifact reduction reconstructed image, and
add a product of a result of 1 minus the weighted image matrix and a matrix of the original reconstructed image, thereby generating the final image.

10. The apparatus for reducing artifacts in Computed Tomography image reconstruction according to claim 6, wherein the initial metal artifact reduction processor is further configured to:
determine a metal projection area in the original reconstructed image;
conduct interpolation correction processing for projection values in the metal projection area; and
conduct restoration and reconstruction processing for the original reconstructed image.

11. A Computed Tomography equipment, comprising:
a scanner configured to scan an object for obtaining raw data, so as to generate an original reconstructed image;
a processor, operably coupled to the scanner, and programmable to execute the steps of:
acquiring the original reconstructed image;
conducting a total variation processing on the original reconstructed image, to generate a total variation reconstructed image;
conducting an initial metal artifact reduction processing on the original reconstructed image, to generate an initial metal artifact reduction reconstructed image;
generating a weighted image based on the total variation reconstructed image and the initial metal artifact reduction reconstructed image, wherein the weighted image reflects that the original reconstructed image contains white-band artifacts; and
combining a portion of the original reconstructed image and a portion of the initial metal artifact reduction reconstructed image through the weighted image to generate final image, wherein the final image does not contain white-band artifact.

* * * * *

UNITED STATES PATENT AND TRADEMARK OFFICE
CERTIFICATE OF CORRECTION

PATENT NO. : 9,443,295 B2  
APPLICATION NO. : 14/471316  
DATED : September 13, 2016  
INVENTOR(S) : Dong et al.

Page 1 of 1

It is certified that error appears in the above-identified patent and that said Letters Patent is hereby corrected as shown below:

On the Title Page

In Item (57), under "ABSTRACT", in Column 2, Line 4, delete "image, then" and insert -- image, --, therefor.

In the Specification

In Column 3, Line 14, delete "detector 22" and insert -- detector 20 --, therefor.

In Column 5, Line 48, delete "$I^{blurred\ weight}$" and insert -- $I^{blurred\ weight}$. --, therefor.

In Column 7, Lines 26-27, delete "generating" and insert -- computing --, therefor.

In Column 7, Line 29, delete "generating" and insert -- computing --, therefor.

In Column 8, Line 20, delete ""littering"" and insert -- "jittering" --, therefor.

In the Claims

In Column 10, Line 33, in Claim 4, delete "multipling" and insert -- multiplying --, therefor.

In Column 11, Line 7, in Claim 6, delete "docs" and insert -- does --, therefor.

In Column 11, Line 13, in Claim 7, delete "substract" and insert -- subtract --, therefor.

In Column 11, Line 19, in Claim 7, delete "processor," and insert -- processor --, therefor.

Signed and Sealed this  
Twenty-seventh Day of December, 2016

Michelle K. Lee  
*Director of the United States Patent and Trademark Office*